United States Patent [19]
Fischle et al.

[11] Patent Number: 5,564,800
[45] Date of Patent: Oct. 15, 1996

[54] TRACTION CONTROL METHOD FOR STABILIZING MOTOR VEHICLE MOTION IN THE EVENT OF INCREASED DRIVING WHEEL SLIP

[75] Inventors: Gerhard Fischle, Esslingen; Matthias Baumann, Boeblingen; Ralph Klingel, Wimsheim; Carola Pfister, Plodingen, all of Germany

[73] Assignee: Mercedes-Benz AG, Germany

[21] Appl. No.: 452,997

[22] Filed: May 30, 1995

[30] Foreign Application Priority Data

May 28, 1994 [DE] Germany ............... 44 18 771.8

[51] Int. Cl.$^6$ .................................... B60T 8/60
[52] U.S. Cl. .................................... 303/140
[58] Field of Search ............... 303/139, 140, 303/144, 150, 149; 364/426.01–426.03

[56] References Cited

FOREIGN PATENT DOCUMENTS

| | | |
|---|---|---|
| 2319862 | 10/1974 | Germany. |
| 3518221C2 | 4/1993 | Germany. |
| 3219464 | 9/1988 | Japan ............... 303/140 |
| 3112754 | 5/1991 | Japan ............... 303/140 |

*Primary Examiner*—Robert J. Oberleitner
*Assistant Examiner*—Peter M. Poon
*Attorney, Agent, or Firm*—Evenson, McKeown, Edwards & Lenahan, P.L.L.C.

[57] ABSTRACT

A method controls the driving stability in the event of increased slip at the driving wheels of a motor vehicle having an electronic traction system with braking intervention at the driving wheels. With excessive high-adhesion wheel slip, synchronous braking intervention on both sides is undertaken at the driving wheels when the vehicle is travelling around a curve. A reduction takes place in the brake pressure at the low-adhesion wheel, as used for controlling drive slip or increasing traction, when the vehicle is travelling in a straight line, the high-adhesion wheel slip is used as the control parameter in either situation. This method permits braking interventions at the driving wheels for the purpose of controlling drive slip and/or for increasing traction while still maintaining a high level of driving stability.

7 Claims, 1 Drawing Sheet

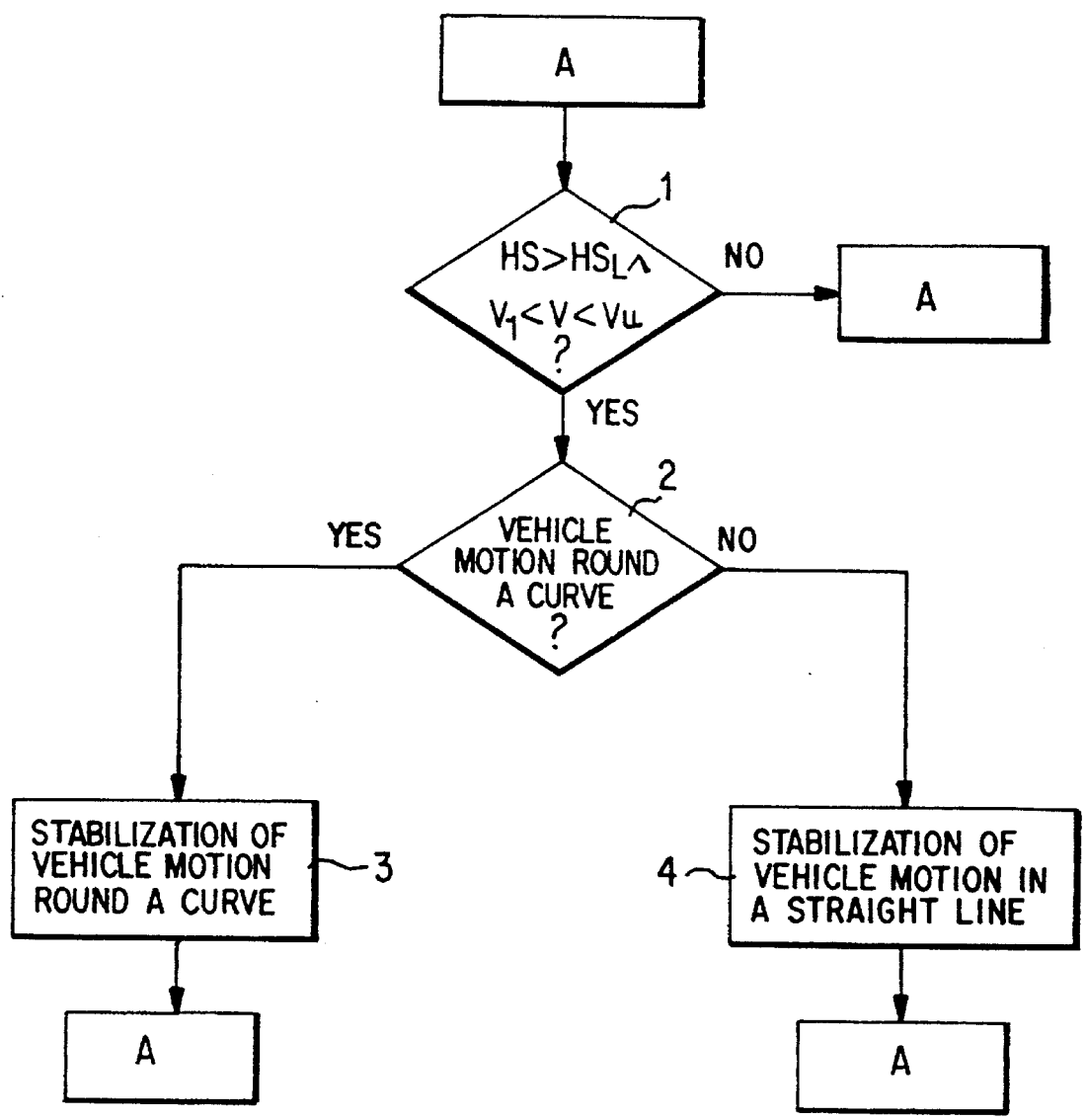

5,564,800

TRACTION CONTROL METHOD FOR STABILIZING MOTOR VEHICLE MOTION IN THE EVENT OF INCREASED DRIVING WHEEL SLIP

CROSS-REFERENCE TO RELATED APPLICATIONS

This application is related to application Ser. No. 08/453,002 filed May 30, 1995, pending for "MOTOR VEHICLE TRACTION SYSTEM CONTROL OSCILLATION DAMPING METHOD USING LOW-ADHESION WHEEL BRAKE INTERVENTION" in the name of Gerhard FISCHLE et al.; application Ser. No. 08/449,660 filed May 24, 1995 now U.S. Pat. No. 5,479,811 for "PROCEDURE FOR CALIBRATING THE WHEEL SPEEDS FOR A MOTOR VEHICLE" in the name of Matthias BAUMANN et al.; application Ser. No. 08/452,532 filed May 30, 1995, pending, for "METHOD FOR CONTROLLING VEHICLE BRAKE PRESSURE AS A FUNCTION OF THE DEVIATION OF THE ACTUAL SLIP OF WHEELS RELATIVE TO A DESIRED SLIP" in the name of Peter BÖSCH et al.; and application Ser. No. 08/452,994 filed May 30, 1995 pending, for "METHOD FOR INCREASING DRIVE TORQUE WITH CONTROLLED BRAKE ENGAGEMENT" in the name of Gerhard FISCHLE et al.

BACKGROUND AND SUMMARY OF THE INVENTION

The present invention relates to a method of traction control to stabilize the driving of a motor vehicle in the case of increased slip at the driving wheels, and more particularly, to a method which uses braking interventions at the driving wheels in the event of increased slip at driving wheels as a function of whether the motor vehicle is travelling around a curve or in a straight line and as a function of the vehicle speed.

It is known that the spinning of the driving wheels, that is to say the appearance of an undesirably high driving wheel slip which reduces traction, can be prevented by braking interventions of an acceleration skid control system (ASR). One driving wheel, specifically that with the lower adhesion (the so-called low-adhesion wheel) frequently begins to spin first, particularly in the case of different coefficients of friction, with the result that there is a loss of driving torque. In order to combat this driving torque loss, an electronic traction system can be provided which undertakes a one-sided braking intervention at the low-adhesion wheel. This active braking on the low-adhesion wheel not only brings it back into a generally more favorable slip range, but also acts simultaneously as a limited-slip torque to increase the traction at the opposite driving wheel, i.e. the wheel with the greater adhesion (the so-called high-adhesion wheel). When the adhesion is no longer sufficient, the wheel slip at the high-adhesion wheel can also become excessive so that the driving stability can be impaired by such braking interventions to increase traction, particularly in the case of high vehicle speeds and on curves.

The article "Ausgebremst" (translation, "Fully Braked") in the "Auto-Motor-Sport" Journal, p. 34 (2.8.1986), describes an electronic differential lock, in which the effect of increasing the traction at the high-adhesion wheel, caused by the effects of braking at the low-adhesion wheel, is used to increase traction.

The difficulty of adequate driving stability, such as is also known from ASR systems, occurs in such electronic traction systems, and for this reason the known electronic differential lock mentioned above, is used only as a pull-away aid and is automatically switched off at vehicle speeds above 40 km/h.

DE 31 27 301 A1 describes a method of traction control to stabilize driving which operates on the so-called select-low principle. That is, an intervention controlling traction takes place on condition that the low-adhesion wheel slip is above a specified limit. As a further measure to stabilize driving, such a traction-control intervention takes place as soon as the system recognizes that the vehicle is travelling round a curve at a speed already in excess of a lower limiting speed of, for example, 40 km/h whereas, when the vehicle is travelling in a straight line, such an intervention is only undertaken when a higher limiting speed of, for example, 100 km/h is exceeded. In the case of vehicle speeds below the lower limiting speed, no traction control intervention to reduce the driving torque and stabilize driving takes place. The traction control interventions provided include subjecting the low-adhesion wheel to brake pressure, with an attempt being made to set a brake pressure which leads to maximum traction torque at the high-adhesion wheel. If the brake disc temperature exceeds a specified threshold value due to these braking interventions, the traction control device is switched off for a specified time interval.

DE 35 18 221 C2 describes a brake system in which measures are taken to stabilize driving during braking procedures when travelling around curves. These measures include the determination of a yaw angle reference value as a function of the vehicle transverse forces, of the vehicle speed and of the distance travelled around the curve as well as the activation of the front and rear wheel brakes, when braking is demanded during travelling around a curve, so that the actual yaw angle value derived from the vehicle transverse forces recorded is adjusted to the yaw angle reference value. This takes place automatically by way of an electronic control unit.

DT 2 319 862 describes an anti-lock system in which, to increase driving stability, two electronic analysis circuits of the wheels of one axle are configured in such a way and are associated with one another such that the brake pressure of one wheel is retained, built up or lowered in order to avoid large brake force differences at the wheels of one axle and/or to achieve a common control cycle variation from an output signal of the other wheel or, during the individual occurrence of the output signal, on the wheel which has to be influenced. In the case of a pair of signals which are time displaced relative to one another, the leading or trailing signal can be used for individual occurrence of a signal can be used for control.

It is an object of the present invention to provide a traction control method to stabilize driving so that a high level of driving stability can be maintained in continuous driving operation even in the case of vehicles in which braking interventions to regulate acceleration skid, and in particular one-sided braking interventions to increase traction, are undertaken at the driving wheels.

This object has been achieved in accordance with the present invention by a method involving monitoring whether high-adhesion wheel slip is above a specified limit and whether vehicle speed is in a range between a specified lower limiting speed and a specified upper limiting speed and, if the response is positive, using the high-adhesion wheel slip as the control parameter; effecting brake pressure at the driving wheels on both sides of the motor vehicle with synchronous brake pressure control upon recognizing that the motor vehicle is travelling around a curve, and reducing brake pressure which increases traction at the low-adhesion wheel upon recognizing that the motor vehicle is travelling in a straight line.

In the event of excessive high-adhesion wheel slip, the method reacts in a different manner to stabilize driving, depending on whether the vehicle is travelling around a curve or in a straight line.

When the vehicle is travelling around a curve, the brake pressure is controlled synchronously on both sides to stabilize the driving on the curve, with the high-adhesion wheel slip being the control parameter which is controlled within a range which ensures sufficient cornering force for the vehicle. The cornering force at the high-adhesion wheel can be maintained by control based on the high-adhesion wheel slip and not on the low-adhesion wheel slip. The low-adhesion wheel is spinning and no longer possesses any cornering force.

Driving instabilities can be prevented by also specifically increasing the brake pressure at the high-adhesion wheel. These driving instabilities are particularly due to the yaw velocity present when the vehicle is travelling around a curve where one-sided braking intervention controlling traction takes place on a condition that the low-adhesion wheel slip is above a low-adhesion wheel when the vehicle is travelling in a straight line, the low-adhesion wheel can be prevented from accelerating by the driver reducing the driving torque, should this be desired.

The present invention has the advantage that the braking intervention which places a load on the brakes on both sides during travel around a curve, remains activated for at most a specified period, with the result that excessive brake heating is prevented. In order to avoid disturbing control oscillations, furthermore, such a braking intervention is deactivated whenever the amount of curvature, or the high-adhesion wheel slip, falls below respectively specified deactivation limits, which are preferably smaller than the activation limits which, when exceeded, activates the braking intervention.

A further feature of the present invention is that brake pressure at the low-adhesion wheel to increase traction is retained when the vehicle speed is below a specified minimum speed even if the vehicle is travelling in a straight line and there is increased high-adhesion wheel slip. This brake pressure retention permits a certain increased high-adhesion wheel slip in the low speed range in order to achieve maximum traction by way of a scraping effect, the driving stability not being noticeably impaired in this range of low speeds.

It has also been found beneficial for the speed range with active stability control to be from 15 km/h to 80 km/h. In this speed range, travel around a curve can be recorded very reliably by wheel rotational speed sensor techniques alone without a transverse acceleration sensor, steering angle sensor or yaw velocity sensor. Below 15 km/h, the driver can still react sufficiently rapidly, it being the case, in addition, that fairly large skidding movements, for example escape turns, remain possible.

BRIEF DESCRIPTION OF THE DRAWING

These and further objects, features and advantages of the present invention will become more readily apparent from the following detailed description thereof when taken in conjunction with the accompanying sole FIGURE which is a diagrammatic flow diagram of the method for controlling the driving stability of a motor vehicle, in the event of increased slip at the driving wheels, by appropriate braking interventions at the driving wheels in accordance with the present invention.

DETAILED DESCRIPTION OF THE DRAWINGS

The flow diagram is part of a more comprehensive, cyclically operated control method of an electronic traction system already present in a motor vehicle. Those parts of the program which are not of more detailed interest in the present context are reproduced in a simplified manner as the program block (A). The method of stabilizing driving in this case forms a functional module within the electronic traction system and takes priority over the actual braking interventions to increase traction at the low-adhesion wheel.

The activation of the part of the program which stabilizes the driving initially assumes that the high-adhesion wheel slip (HS) exceeds a specified slip limit ($HS_L$) which is fixed as a function of a reference wheel speed which represents the average wheel speeds of the non-driven wheels, and also that the vehicle speed is between a lower limiting speed ($v_l$) and an upper limiting speed ($v_u$), something which is determined by interrogation in an initial Step 1. The lower speed limit ($v_l$) is set, in the present example, to 15 km/h and the upper speed limit ($v_u$) is set to 80 km/h. The vehicle speed is determined as the average of the wheel speeds, corrected for curve and wheel adjustments, of the non-driven wheels. The high-adhesion wheel is recognized as the driving wheel which is rotating more slowly and the low-adhesion wheel is recognized as the driving wheel which is rotating more rapidly. The driving wheel speeds corrected for curve and wheel adjustment are compared with one another for this purpose. It may, therefore, be seen that recording the wheel rotational speeds is sufficient for the determination of these parameters. The high-adhesion wheel slip (HS) is then evaluated in the form of the difference between the high-adhesion wheel speed and the reference wheel speed.

If the response to the interrogation in Step 1 is negative, the procedure is continued with other parts of the traction control program, for example with an actual braking intervention to increase traction. If, on the other hand, the response to the interrogation is positive, the next interrogation step, i.e. Step 2, checks whether the vehicle is travelling around a curve. The conclusion that the vehicle is starting to travel around a curve is drawn if the wheel speed difference of the front wheels is greater than a specified limit, which is set to 1 km/h in the present illustration. If the fact that this limit is being exceeded, and therefore that the vehicle is starting to travel around a curve, is recognized, the method of controlling the driving stability provides for stability control as follows while the curve is being negotiated as provided in Step 3.

The control system is activated each time the high-adhesion wheel slip (HS) exceeds the specified slip limit ($HS_L$) plus a percentage curve offset value which is used to prevent premature initiation of the control in the case of extremely tight curve radii. As an example, the curve offset value is a tenth of the difference between the wheel speeds of the non-driven front wheels.

After activation, braking intervention at the driving wheels takes place on both sides in order to remove the excess torque by braking action. The intervention is carried out synchronously so that no limited-slip torque, and therefore no yawing torque, is generated. The high-adhesion wheel is brought back into the stable range by specific phases of pressure build-up, pressure retention and pressure reduction which depend on the high-adhesion wheel slip and the high-adhesion wheel slip acceleration, with the difference between the high-adhesion wheel speed and the reference wheel speed being used as the control parameter.

In order to protect the brakes from thermal overload, the braking intervention on both sides is only permitted for a fixed maximum duration which is, for example, 2 s in the present example. This duration is normally sufficient because a maneuver involving a turn does not, on average, last any longer.

A time counter is always set whenever the system concludes that the vehicle is starting to travel around a curve to recognize how long the vehicle has been travelling around the curve. If the high-adhesion wheel slip ceases while the vehicle is travelling around a curve, the time counter remains at its instantaneous value. If the high-adhesion wheel slip reappears while the vehicle is travelling around the same curve, the braking intervention can be continued for the period still remaining. If the fixed permissible maximum duration has elapsed but the requirement for high-adhesion wheel slip control is still present, the brake pressure is slowly reduced on both sides with the result that the driver is left with sufficient time to react to the onset of the vehicle yawing motion.

If the driving wheel brakes have not been activated when braking intervention is started on both sides in order to stabilize the vehicle's motion around a curve, this braking intervention takes place, as above noted, synchronously at both driving wheels by a simultaneous and equally large brake pressure change.

The braking intervention to stabilize the vehicle's motion around a curve can also have been activated by a previous, one-sided braking intervention on the low-adhesion wheel in order to increase traction, in situations where this braking intervention at the low-adhesion wheel has led to an excessive drive slip at the high-adhesion wheel because of the limited-slip torque placed on the high-adhesion wheel. In these situations, a certain brake pressure is already present at the low-adhesion wheel at the beginning of the method for stabilizing the vehicle's motion around the curve. The brake pressure control to stabilize the vehicle's motion around the curve then takes place by initially retaining the brake pressure at the low-adhesion wheel and increasing the brake pressure at the high-adhesion wheel. If the wheel slip to be adjusted at the high-adhesion wheel has already been reached before its pressure is equal to that at the low-adhesion wheel, the brake pressure at the low-adhesion wheel also continues to be retained throughout a subsequent high-adhesion wheel brake pressure retention phase. If, however, the desired high-adhesion wheel slip has not yet been reached when the high-adhesion wheel brake pressure is the same as that of the low-adhesion wheel, the brake pressures of both driving wheels are subsequently further increased synchronously during the same period.

An analogous procedure is adopted during brake pressure reduction phases. If, on one hand, the same brake pressures are initially present, both of them are reduced synchronously. If, on the other hand, the high-adhesion wheel brake pressure is still lower than the low-adhesion wheel brake pressure at the beginning of a brake pressure reduction phase, the low-adhesion wheel brake pressure is first reduced to the pressure level of the high-adhesion wheel, after which both brake pressures are then, once again, further controlled in a synchronous manner. This mode of operation has the advantage that when the vehicle is travelling around a curve, the limited-slip torque is initially reduced because the pressures at the two driving wheels are brought into balance.

In addition, the excess driving torque caused by the driver and endangering stability is eliminated by the build-up of pressure at the high-adhesion wheel so that the high-adhesion wheel is again given maximum cornering force. When the vehicle has been restabilized, one-sided braking intervention to increase traction is only initiated afresh if both driving wheels are no longer subjected to brake pressure.

Apart from the situation where the maximum control duration has been exceeded, as described above, the control phase to stabilize the vehicle's motion around a curve is terminated when the vehicle is again travelling in a straight line or when the vehicle speed is no longer in the previously described range between 15 km/h and 80 km/h or when the high-adhesion wheel slip has fallen below a specified deactivation limit. Depending on whether the vehicle is travelling around a curve, this deactivation limit is preferably selected in this case to be somewhat smaller than the slip limit ($HS_L$), smaller in the present example by $\frac{1}{15}$ of the difference between the wheel speeds of the front wheels. Selecting a switch-off threshold which is somewhat lower than the switch-on threshold avoids control oscillations.

A system conclusion is drawn that the vehicle is beginning to travel in a straight line, i.e. the vehicle has stopped travelling around a curve, when the wheel speed difference at the front wheels is smaller than a limit which, in the present case, is set to 0.5 km/h. Here again, selecting a limit for recognizing that the vehicle has stopped travelling around a curve which is lower than that for recognizing that it has started to travel around a curve is once again intended to avoid undesirable control oscillations. The control for stabilizing the vehicle's motion around a curve is terminated in each instance by setting a pressure reduction gradient to correspond with the wheel slip variation. Furthermore, the stability control for a vehicle travelling around a curve is terminated immediately if a braking procedure to decelerate the vehicle is initiated and/or the anti-lock system announces priority.

If, after a previous positive response to the interrogation in Step 1, the interrogation Step 2 recognizes that the vehicle is not travelling around a curve but is travelling in a straight line, the method controls the stability of the vehicle's motion for straight line motion in Step 4 as follows. The system first determines whether the vehicle speed has, in the meantime, dropped below the lower range limit of 15 km/h. A comparatively high high-adhesion wheel slip is permitted in this low speed range in order to reach the maximum traction by a scraping effect because, in this speed range, the driving stability is not essentially impaired. For this purpose, the brake pressure in the low-adhesion wheel is initially retained and the system waits to see whether the high-adhesion wheel has already begun to adhere again after a very short period, as is the case when the vehicle drives over spots with a low coefficient of friction. If the high-adhesion wheel slip now increases further and if, in fact, this wheel should possibly rotate even more rapidly than the low-adhesion wheel, the system recognizes that increased traction is no longer attainable and it starts to reduce the pressure at the low-adhesion wheel until the high-adhesion wheel slip is again below the limit ($HS_L$). Thereafter, actual traction control can again be undertaken.

If, however, the vehicle is travelling in a straight line at a speed above the lower limit of 15 km/h, the driving stability control immediately reduces the brake pressure present at the low-adhesion wheel for the purpose of increasing traction. This reduces the driving torque at the high-adhesion wheel and the high-adhesion wheel can again rapidly undertake the transmission of side forces. During this stabilization phase, the low-adhesion wheel can only be prevented from accelerating by a reduction in driving torque, for example by the driver, if this should appear expedient. As soon as the high-adhesion wheel slip again falls below the specified limit ($HS_L$), the actual one-sided, traction-increasing brake pressure control at the low-adhesion wheel can continue.

The above-described method permits the maintenance of a high level of driving stability both when the vehicle is travelling around a curve and when it is travelling in a straight line, particularly in those cases where the driving stability could be otherwise impaired because of one-sided braking interventions at the driving wheels for the purpose of increasing traction. This makes it possible to employ an electronic traction system which fulfills the function of an automatic differential lock but without endangering driving stability over a wide range of possible driving conditions and without the system having to be limited, for example, to the function of a pull-away aid.

Although the invention has been described and illustrated in detail, it is to be clearly understood that the same is by way of illustration and example, and is not to be taken by way of limitation. For example, the numerical data described above only represents one possible selection and can be respectively modified in a suitable manner for other applications. The method according to the present invention for driving stability control can, of course, also be usefully employed in association with a conventional ASR system. The spirit and scope of the present invention are, therefore, to be limited only by the terms of the appended claims.

We claim:

1. A method of traction control for stabilizing driving of a motor vehicle, comprising the steps of
   (a) using braking interventions at the driving wheels in the event of increased slip at driving wheels as a function of whether the motor vehicle is one of travelling around a curve and in a straight line, and further as a function of the vehicle speed,
   (b) monitoring whether high-adhesion wheel slip is above a specified limit and whether vehicle speed is in a range between a specified lower limiting speed and a specified upper limiting speed and, if a response is positive, using the high-adhesion wheel slip as the control parameter;
   (c) effecting brake pressure at the driving wheels on both sides of the motor vehicle with synchronous brake pressure control upon recognizing that the motor vehicle is travelling around a curve, and
   (d) reducing brake pressure which increases traction at the low-adhesion wheel upon recognizing that the motor vehicle is travelling in a straight line.

2. The method according to claim 1, wherein braking action on both sides of the motor vehicle to stabilize the motor vehicle when travelling around a curve is terminated when the motor vehicle is no longer travelling around a curve, when the vehicle speed is no longer within the specified range, when the high-adhesion wheel slip drops below a specified limit or when a specified maximum braking intervention duration has been exceeded during travelling around a curve.

3. The method according to claim 1, wherein brake pressure present at the low-adhesion wheel to increase traction is retained when the vehicle speed is below the specified lower speed and the high-adhesion wheel slip is below a specified upper limit even with a system recognition that the vehicle is travelling in a straight line and the high-adhesion wheel slip is below a specified lower limit.

4. The method according to claim 3, wherein braking action on both sides of the motor vehicle to stabilize the motor vehicle when travelling around a curve is terminated when the motor vehicle is no longer travelling around a curve, when the vehicle speed is no longer within the specified range, when the high-adhesion wheel slip drops below a specified limit or when a specified maximum braking intervention duration has been exceeded during travelling around a curve.

5. The method according to claim 1, wherein, for at least one of undertaking braking action on both sides of the motor vehicle to stabilize the motor vehicle when travelling around a curve, and for reducing in the brake pressure at the low-adhesion wheel to increase traction, the lower limiting speed is 15 km/h and the upper limiting speed is 80 km/h.

6. The method according to claim 5, wherein braking action on both sides of the motor vehicle to stabilize the motor vehicle when travelling around a curve is terminated when the motor vehicle is no longer travelling around a curve, when the vehicle speed is no longer within the specified range, when the high-adhesion wheel slip drops below a specified limit or when a specified maximum braking intervention duration has been exceeded during travelling around a curve.

7. The method according to claim 6, wherein brake pressure present at the low-adhesion wheel to increase traction is retained when the vehicle speed is below the specified lower speed and the high-adhesion wheel slip is below a specified upper limit even with a system recognition that the vehicle is travelling in a straight line and the high-adhesion wheel slip is below a specified lower limit.

* * * * *